US011854155B2

(12) United States Patent
Nozaki et al.

(10) Patent No.: US 11,854,155 B2
(45) Date of Patent: Dec. 26, 2023

(54) DATA PROCESSING PROGRAM, DATA PROCESSING METHOD AND DATA PROCESSING DEVICE FOR DISPLAYING EXTERNAL INFORMATION IN VIRTUAL SPACE

(71) Applicant: GREE, INC., Tokyo (JP)

(72) Inventors: Masato Nozaki, Tokyo (JP); Miharu Watanabe, Tokyo (JP); Junko Sakurai, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/459,533

(22) Filed: Aug. 27, 2021

(65) Prior Publication Data

US 2021/0390791 A1  Dec. 16, 2021

Related U.S. Application Data

(63) Continuation of application No. 16/414,094, filed on May 16, 2019, now Pat. No. 11,127,224.

(30) Foreign Application Priority Data

May 17, 2018 (JP) .................................. 2018-095165

(51) Int. Cl.
*G06T 19/20* (2011.01)
*G06T 15/20* (2011.01)
(Continued)

(52) U.S. Cl.
CPC ............ *G06T 19/20* (2013.01); *G06T 15/205* (2013.01); *G06T 19/006* (2013.01); *G02B 27/017* (2013.01)

(58) Field of Classification Search
CPC ..... G06T 19/20; G06T 15/205; G06T 19/006; G02B 27/017; G02B 2027/0138; G02B 2027/0187
See application file for complete search history.

(56) References Cited

U.S. PATENT DOCUMENTS 7,086,005 B1 *  8/2006 Matsuda ............... H04M 7/003
                                                    715/706
9,106,956 B2 *  8/2015 Chun .................. H04N 21/4312
(Continued)

FOREIGN PATENT DOCUMENTS

JP  2004-021521 A   1/2004
JP  2015-118332 A   6/2015
(Continued)

OTHER PUBLICATIONS

JP 2016-198180 A (Machine Translation on Apr. 26, 2020) (Year: 2016).*

(Continued)

*Primary Examiner* — Michael Le
(74) *Attorney, Agent, or Firm* — Oliff PLC

(57) ABSTRACT

A processing device that causes a virtual-space image to be displayed on a display device mounted on a player's head is provided with a first display processor and a second display processor. The first display processor causes first external information input from outside to be displayed on a specified object included in the virtual-space image when the virtual-space image is being caused to be displayed by the HMD. The second display processor causes second external information that is second external information input from outside and includes a real-space image to be displayed along with the virtual-space image when the virtual-space image is caused to be displayed by the HMD. The virtual-space image is, for example, the virtual-space image of a game, and the real-space image is, for example, an image imaged by an imaging device installed in the surroundings of the player.

19 Claims, 8 Drawing Sheets

(51) Int. Cl.
*G06T 19/00* (2011.01)
*G02B 27/01* (2006.01)

(56) References Cited

U.S. PATENT DOCUMENTS

| | | |
|---|---|---|
| 2002/0094069 A1 | 7/2002 | Takahashi et al. |
| 2004/0070620 A1* | 4/2004 | Fujisawa ............ H04N 21/4532 715/764 |
| 2012/0113296 A1* | 5/2012 | Kunishige ............ H04N 5/2621 348/234 |
| 2013/0144482 A1* | 6/2013 | Tuukkanen ............. G06F 9/451 701/29.6 |
| 2013/0151342 A1* | 6/2013 | Citron ..................... A63F 13/79 705/14.66 |
| 2014/0253591 A1 | 9/2014 | Hayakawa et al. |
| 2015/0145790 A1 | 5/2015 | Kim et al. |
| 2015/0153570 A1 | 6/2015 | Yamamoto et al. |
| 2016/0054565 A1 | 2/2016 | Zumihara et al. |
| 2016/0282618 A1 | 9/2016 | Kon et al. |
| 2016/0330522 A1 | 11/2016 | Newell et al. |
| 2017/0059871 A1* | 3/2017 | Hashiba ................ A63F 13/24 |
| 2017/0256096 A1* | 9/2017 | Faaborg ................ G06T 19/003 |
| 2018/0004286 A1* | 1/2018 | Chen ........................ G06F 3/012 |
| 2018/0005439 A1* | 1/2018 | Evans .................... G06T 19/006 |
| 2018/0114566 A1* | 4/2018 | Aoyama ................... H04N 13/332 |
| 2019/0179512 A1* | 6/2019 | Gordon ................. G06T 19/006 |

FOREIGN PATENT DOCUMENTS

| | | | |
|---|---|---|---|
| JP | 2016-198180 A | 12/2016 | |
| JP | 2016198180 A | * 12/2016 | ........... A63F 13/213 |

OTHER PUBLICATIONS

Mar. 29, 2022 Office Action issued in Japanese Patent Application No. 2021-077850.
Jul. 1, 2020 Office Action issued in Japanese Patent Application No. 2018-095165.
Feb. 2, 2021 Office Action issued in Japanese Patent Application No. 2018-095165.
Aug. 30, 2022 Office Action issued in Japanese Patent Application No. 2021-077850.

* cited by examiner

DATA PROCESSING PROGRAM, DATA PROCESSING METHOD AND DATA PROCESSING DEVICE FOR DISPLAYING EXTERNAL INFORMATION IN VIRTUAL SPACE

CROSS-REFERENCE TO RELATED APPLICATION(S)

This application is a continuation of U.S. application Ser. No. 16/414,094 filed May 16, 2019, which is based on and claims priority under 35 U.S.C. 119 from Japanese Patent Application No. 2018-095165 filed on May 17, 2018. The entire contents of the above applications are incorporated herein by reference.

TECHNICAL FIELD

The present invention relates to a data processing program, data processing method and data processing device that enable display of external information in a virtual space.

BACKGROUND TECHNOLOGY

When a head mounted display (hereafter, "HMD") is mounted as a display device on a player's head, the player becomes immersed in the images displayed on the HMD and has difficulty recognizing the environment surrounding the player. Hence, as in Patent Reference 1 or the like, the status of the surrounding environment can be displayed by messages in the HMD's display, and a real-space image of the surrounding environment imaged by a camera can be displayed in the HMD's display.

PRIOR ART REFERENCE

Patent Reference

[Patent Reference 1] Japanese Published Patent Application 2016-198180

SUMMARY

Problem to be Resolved

However, when wearing an HMD and playing a game, merely displaying real-space images of the surrounding environment at times provides insufficient information.

It is an object to provide a data processing program, a data processing method and a data processing device that enable the display of various information on a display device a player is wearing.

Means of Solving the Problem

A data processing program that resolves the above-described problem causes a control device that causes display of a virtual-space image by a display device mounted on a player's head to function as at least one display processor out of (i) a first display processor that, when the virtual-space image is displayed on the display device, causes a display of first external information input from outside, with respect to a first specified object included in the virtual-space image, and (ii) a second display processor that, when the virtual-space image is displayed on the display device, causes a display of second external information that is second external information input from the outside and includes a real-space image, along with the virtual-space image.

With the above-described configuration, at least one item of external information out of the first external information and the second external information is displayed by the display processor. Accordingly, even when wearing the display device and immersed in the game, the player can recognize at least one item of external information out of the first external information and the second external information.

In the above-described data processing program, when the second display processor is provided, the real-space image may be an image in which the environment surrounding the player has been imaged, and when a change is detected in the second external information, the second display processor may cause the real-space image to be displayed as the second external information along with the virtual-space image.

With the above-described configuration, the real-space image of the second external information is such that when change thereof is detected, the real-space image can be timely displayed along with the virtual-space image and not constantly displayed. Accordingly, the second external information is less likely to interfere with the player playing the game.

In the above-described data processing program, when the second display processor is provided, the second display processor may cause the real-space image to be displayed as the second external information, superimposed on the virtual-space image. With the above-described configuration, the second external information including the real-space image is displayed superimposed on the virtual-space image of the game, so it is possible to prevent the display region of the virtual-space image from being narrowed.

In the above-described data processing program, when the second display processor is provided, the control device may be caused to function as an object specifying unit that specifies a second specified object from within the virtual-space image, and the second display processor may cause the real-space image as the second external information to be displayed, superimposed on the second specified object.

With the above-described configuration, it is possible to display the real-space image without a sense of incompatibility in the virtual-space image, by displaying the real-space image of the second external information in an information display region of a second specified object included in the virtual-space image.

In the above-described data processing program, when the second display processor is provided, the second display processor may cause the virtual-space image to be displayed superimposed on the real-space image. With the above-described configuration, it is possible to make the real-space image stand out to the player, and by displaying the virtual-space image, it is possible to prevent a loss of continuity in virtual-space images continuous in time.

In the above-described data processing program, the control device may be caused to function as an object specifying unit that specifies a third specified object from within the real-space image and causes the virtual-space image to be displayed on the third specified object.

With the above-described configuration, the third specified object is specified from within the real-space image, and the virtual-space image is displayed in an information display region of the third specified object. Accordingly, it is possible to display the virtual-space image without a sense of incompatibility in the real-space image.

In the above-described data processing program, when the second display processor is provided, the second display processor may split the display region and cause the virtual-space image to be displayed in one display region and cause the real-space image as the second external information to be displayed in the other display region. With the above-described configuration, the player can easily see each image.

In the above-described data processing program, when the first display processor is provided, the first external information may be of a plurality of types and have acquisition destinations in accordance with type, and the control device may be caused to function as an acquisition unit that acquires the first external information from each acquisition destination for the first external information registered beforehand. With the above-described configuration, by registering a plurality of acquisition destinations of the first external information, it is possible to acquire the first external information easily and to display such on the first specified object.

In the above-described data processing program, the control device may be caused to function as a determination unit that displays specific first external information with priority when a plurality of types of items of the first external information is input. With the above-described configuration, it is possible to display a specific item of first external information with priority over other items of first external information.

In the above-described data processing program, when the first display processor and the second display processor are provided, the control device may be caused to function as a determination unit that determines whether input from the outside is the first external information or the second external information. With the above-described configuration, it is possible to display with priority either item of external information out of the first external information and the second external information.

In the above-described data processing program, when the second display processor is provided, the control device may be caused to function as a determination unit that displays specific second external information with priority when a plurality of types of items of the second external information is input. With the above-described configuration, it is possible to display a specific item of the second external information with priority over other items of the second external information.

A data processing method that resolves the above-described problem is a data processing method that causes a virtual-space image to be displayed on a display device mounted on a player's head, the data processing method executing at least one display processing step out of (i) a first display processing step that, when the virtual-space image is displayed on the display device, causes a display of first external information input from outside, on a first specified object included in the virtual-space image, and (ii) a second display processing step that, when the virtual-space image is displayed on the display device, causes a display of second external information that is second external information input from the outside and includes a real-space image, along with the virtual-space image.

A data processing device that resolves the above-described problem is a data processing device that causes a virtual-space image to be displayed on a display device mounted on a player's head, the data processing device being provided with at least one display processing unit out of (i) a first display processing unit that, when the virtual-space image is displayed on the display device, causes a display of first external information input from outside, on a first specified object included in the virtual-space image, and (ii) a second display processing unit that, when the virtual-space image is displayed on the display device, causes a display of second external information that is second external information input from the outside and includes a real-space image, along with the virtual-space image.

Effects

With the present embodiments it is possible to provide a data processing program, a data processing method and a data processing device that enable the display of various information on a display device a player is wearing.

MODES TO IMPLEMENT EMBODIMENTS

A game processing system that applies the present embodiments will be described with reference to FIG. 1 through FIG. 13.

Overview

Figure 1:
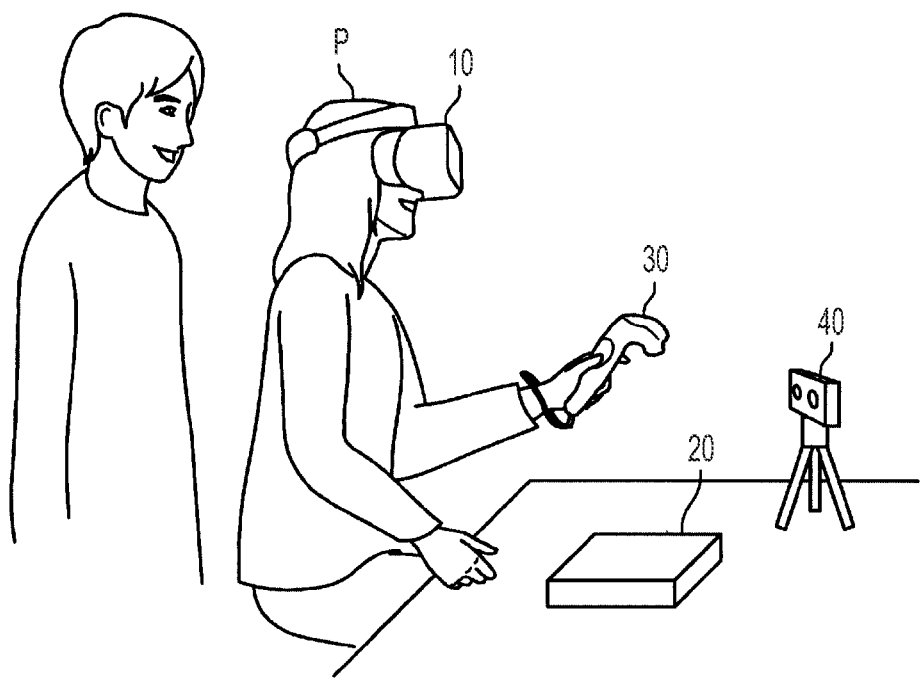
FIG. 1 is a perspective view schematically showing an embodiment of a data processing system.

As shown in FIG. 1, a game processing system to which the present embodiments are applied is provided with a head mounted display (hereafter, HMD) 10, a game processing device 20, an operating device 30 and an imaging device 40. The HMD 10 and the game processing device 20 communicate by wired or wireless communication. In addition, wired or wireless communication is also accomplished between (i) the operating device 30 and (ii) the HMD 10 and the game processing device 20. Furthermore, wired or wireless communication is also accomplished between (i) the imaging device 40 and (ii) the HMD 10 and the game processing device 20. With the game processing system, a virtual reality game can be played.

The HMD 10 is mounted on the head of a player P, and the operating device 30 is operated by the player P. The game processing device 20 causes a virtual-space image of the game to be displayed on the HMD 10 from a point of view corresponding to at least the orientation of the HMD 10, and manages the progress of the game accomplished in a virtual space on the basis of information detected by the HMD 10 and the operating device 30. One HMD 10 corresponds to one operating device 30. Accordingly, the HMD 10 and the operating device 30 that are associated with each other are used by the same player. The game processing system may be a plurality of sets of HMD 10 and operating devices 30, and when there is a plurality, the game can be played simultaneously by a plurality of people. The game processing system is provided with the imaging device 40, which images real-space images surrounding the player P. Even when the player P is immersed in the game, the game processing system can provide notification, as first external information, of the arrival of messages such as email to the player, or strategy information of the game being played. In addition, even when the player P is immersed in the game, the imaging device 40 can provide notification of the surrounding environment to the player P wearing the HMD 10 when changes in the surrounding environment occur.

[HMD]

Figure 2:
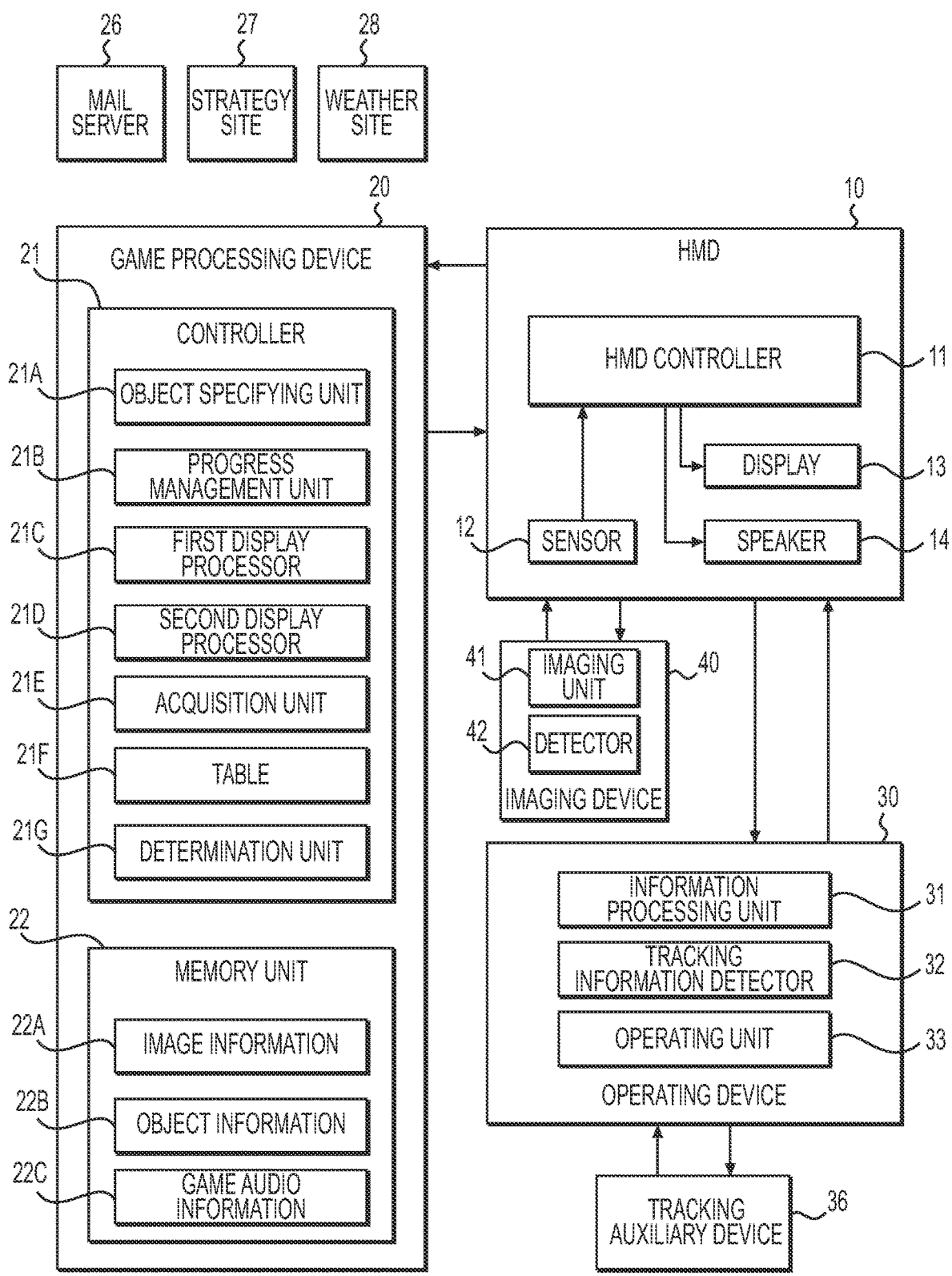
FIG. 2 is a block diagram of the data processing system.

As shown in FIG. 2, the HMD 10 is provided with an HMD controller 11, a sensor 12, a display 13 and a speaker 14. The HMD 10 outputs various types of information to the game processing device 20, and also receives input of various types of information from the game processing device 20.

The sensor 12 detects at least the orientation of the HMD 10 in real space. The sensor 12 may also detect the position of the HMD 10. The sensor 12 is provided, for example, with at least one out of a gyro sensor, an acceleration sensor, a geomagnetism sensor or the like. For example, the sensor 12 may be further provided with a line of sight sensor, and may directly detect the direction in which the player's line of sight is directed (line of sight direction).

Figure 3:
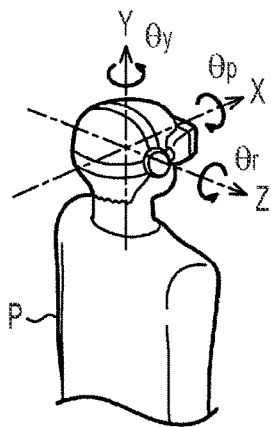
FIG. 3 is a drawing showing a coordinate system used in specifying the position and orientation of a player's head.

The HMD controller 11 detects the orientation of the head of the player P using a detection result of the sensor 12. The HMD controller 11 may detect the position of the head, in addition to the orientation of the head of the player P. The HMD controller 11, when detecting the orientation of the head, detects the orientation as angles about various axes. The HMD controller 11, when detecting the position of the head, detects the position in three axial directions. For example, as shown in FIG. 3, the three axes are the X axis running in the horizontal direction, the Y axis running in the vertical direction and the Z axis running the depth direction. The angles about the axes are a pitch θp indicating a rotational direction centered on the X axis, a yaw θy indicating a rotational direction centered on the Y axis, and a roll Or indicating a rotational direction centered on the Z axis.

The HMD controller 11 includes an input/output interface and transmits to the game processing device 20 the orientation of the head of the player P. When the HMD controller 11 detects the position of the head of the player P, the position of the head is transmitted to the game processing device 20. The game processing device 20 calculates the orientation of the player P (the line of sight direction of a virtual camera) in the virtual space from the orientation and the like of the head of the player P.

The display 13 is one example of a display device. The display 13 outputs parallax images and causes the player P to visualize a three-dimensional image having a sense of depth. The game processing device 20 generates image data for outputting the parallax images on the basis of the orientation of the player P in the virtual space. The game processing device 20 transmits the generated image data to the HMD 10. The HMD controller 11 causes the images of the virtual space to be displayed on the display 13 using signals received from the game processing device 20.

The speaker 14 outputs game audio such as sound effects flowing in the background of the parallax images, voices, music and the like. The game processing device 20 grasps the progress status of the game and generates audio data for outputting sounds suited to the progress status of the game. The game processing device 20 transmits the generated audio data to the HMD 10. The HMD controller 11 outputs the audio signal received from the game processing device 20 to the speaker 14.

[Operating Device]

The operating device 30 is configured to be capable of wired or wireless communication with the HMD 10 associated with that operating device 30, and is carried by the player P, with the player P holding the operating device 30 in a hand or the player P mounting the operating device 30 on a hand or arm. The operating device 30 is provided with an information processing unit 31, a tracking information detector 32 and an operating unit 33.

The information processing unit 31 includes a processor, a memory, a communication interface and the like. The information processing unit 31 outputs to the HMD 10 (i) a signal in accordance with the detection results of the sensor 12, and (ii) a signal corresponding to an operation upon the operating unit 33. The HMD 10 outputs to the game processing device 20 a signal corresponding to the signal input from the operating device 30.

The tracking information detector 32 includes a device for detecting information for calculating the position and orientation of the operating device 30. The position of the operating device 30 corresponds to the position of the hand of the player P. The tracking information detector 32 includes a sensor for detecting changes in at least the direction. For example, at least one sensor out of a gyro sensor, an acceleration sensor and a geomagnetism sensor is included. The position of the operating device 30 calculated from detection results from the tracking information detector 32 may be a position relative to an initial position of the operating device 30, may be a position relative to the position of the HMD 10 corresponding to the operating device 30, or may be an absolute position in real space.

The operating unit 33 is, for example, a button type the player P operates by pressing, or a lever type such as a joystick that moves up, down, left and right, and is configured so as to be operable without the player P looking thereat. In addition, the operating unit 33 may be a touch panel. The operating device 30 may communicate directly with the game processing device 20 without going through the HMD 10, and may output a signal corresponding to the detection results of the tracking information detector 32 and a signal corresponding to operation upon the operating unit 33 to the game processing device 20. In this case, the association between the HMD 10 and the operating device 30 may be managed in the game processing device 20 by recording association of the respective identification information of the HMD 10 and the operating device 30.

For example, the tracking information detector 32 may include a position detection device primarily for detecting information used in calculating the position of the HMD 10. Specifically, the position detection device can detect information for calculating the position of the HMD 10 through cooperation with a tracking auxiliary device 36 provided separate from the HMD 10 in the real space in which the player P is positioned. The position detection device and the tracking auxiliary device 36 may also be used to calculate orientation of the HMD 10 in addition to its position. For example, one out of the position detection device and the tracking auxiliary device 36 is a light-emitting device such as a laser device, an LED or the like that emits infrared light or visible light, and the other out of the position detection device and the tracking auxiliary device 36 is a light-receiving device such as a camera or the like that receives the light corresponding to the above-described light-emitting device. Furthermore, information is detected such as (i) the light from which of the light-emitting devices out of a plurality of light-emitting devices having prescribed positions was received by the light-receiving device, (ii) which of the light-receiving devices out of a plurality of light-receiving devices having prescribed positions received the light from the light-emitting device, (iii) the direction of emission of light from the light-emitting device, and (iv) the time needed for light emitted from the light-emitting device to reach the light-receiving device, and on the basis of such information, the position and orientation of the HMD 10 is detected. When the tracking auxiliary device 36 is a light-receiving device, or when the tracking auxiliary device 36 is a light-emitting device and the emitted light is controlled by the game processing device 20, the tracking auxiliary device 36 may be configured to be capable of communicating with the game processing device 20 directly, or via the HMD 10.

The tracking information detector 32 may be configured so that the position and orientation of the HMD 10 can be detected using only the detection results from the tracking information detector 32 with which the HMD 10 is provided, without using the tracking auxiliary device 36 installed external to the HMD 10. The position of the HMD 10 calculated from the detection results of the tracking information detector 32 may be a position relative to the initial position of the HMD 10, or may be an absolute position in real space, that is to say in three-dimensional space of a prescribed size where the player P is positioned when playing the game.

[Imaging Device]

The imaging device 40 is configured so as to be capable of wired or wireless communication with the game processing device 20 and the HMD 10. The imaging device 40 images the environment surrounding the player. The imaging device 40 may be installed on a table or the like near the player P by a tripod or the like. The imaging direction of the imaging device 40 in such cases may be the line of sight direction of the player P or may be the back direction of the player P. When the line of sight direction of the player P is the imaging direction, it is possible to detect people or the like approaching from the front of the player P. In addition, when the back direction of the player P is the imaging direction, it is possible to detect people and the like approaching from the rear of the player P. In addition, the imaging device 40 may be a device that images the outdoors. An imaging device 40 capable of imaging the outdoors is installed outdoors such as on the roof of the building in which the player P is. The imaging device 40 can acquire real-time images of a plurality of locations such as the environment surrounding the player P or conditions outdoors or the like, by being provided with a plurality of imaging units. Naturally, the number of imaging units and the locations where such are installed are not limited to these locations.

The imaging device 40 is provided with an imaging unit 41 and a detector 42. The imaging unit 41 may be provided with a right-eye imaging element and a left-eye imaging element so as to be capable of displaying three-dimensional images, for example. The imaging elements are, for example, CCD elements or CMOS elements. The imaging unit 41 is, for example, a camera provided with a wide-angle lens. In addition, the imaging range may be around 60°, or may be around 180°, or may be 360°. For example, by being installed on a tripod, the imaging device 40 may automatically rotate in a pan direction and a tilt direction. The imaging unit 41 is at least installed in the environment around the player P (near the game processing device 20) or outdoors. When a plurality of imaging units 41 is provided, all of the imaging units need not be provided with two imaging elements.

The detector 42 is a human sensor, for example. The detector 42 is a heat sensor that detects changes in the surrounding temperature through infrared rays, a light sensor that detects reflection of light, a sound wave sensor that detects changes in sound waves, a sound sensor that detects sounds, a touch sensor that detects the static electricity of people, or the like, and detects when people approach the surroundings of the player P. Furthermore, when a living body such as a person or the like is detected, the surrounding environment is imaged by the imaging unit 41. The detector 42 may not only be configured using sensors but may also be a detector unit that detects changes in images through data processing. For example, when the region being imaged is a static space in which no moving body exists and a person appears therein, change occurs in the real-space image to that point. The detector 42 may also detect change in the image and output this to the HMD 10 and the game processing device 20. Furthermore, a rain sensor, a humidity sensor, a temperature sensor or the like, for example, may be positioned near the imaging unit 41 outdoors, and through this, it becomes possible to detect various outdoor environments. With this kind of detector 42, when imaging units 41 are positioned at a plurality of locations, a detector 42 may be provided in each imaging unit 41, or may be provided only in the imaging unit 41 indoors, or may be provided only in the imaging unit 41 outdoors. In addition, differing types of detectors 42 may be provided in accordance with the location where the imaging unit 41 is positioned.

[Game Processing Device]

The game processing device 20 comprises a central processing device, memory and various types of hardware elements such as application-specific integrated circuits. The game processing device 20 is provided with a controller 21 that is one example of a control device, and a memory unit 22. The game processing device 20 and the HMD 10 may have a relationship such that one HMD 10 is connected to one game processing device 20, or may have a relationship in which a plurality of HMDs 10 are connected to one game processing device 20.

The controller 21 executes a game processing program in the hardware elements, and functions as an object specifying unit 21A, a progress management unit 21B, a first display processor 21C, a second display processor 21D, an acquisition unit 21E, a table 21F and a determination unit 21G. The memory unit 22 stores various types of information used in the progress of the game. The information stored in the memory unit 22 includes image information 22A, object information 22B and game audio information 22C. In addition, the game processing program is installed from an external recording medium such as a network, an optical disc, a hard disk, a USB memory or the like.

The image information 22A is one example of virtual space information and is information for displaying an image of the virtual space. Images of the virtual space include an image that is the background of the virtual space and images of objects existing in the virtual space. The objects existing in the virtual space include objects that exist only in the virtual space.

The objects are unit elements of images displayed on the display 13. The objects include, for example, game characters such as player characters, enemy characters, ally characters, neutral characters and the like. The objects include, for example, game media such as game items like weapons, armor, magic, vehicles, buildings, cell phones, smartphones, bulletin boards and the like. For example, the game media may be things used within the game and may be things used outside the game. The game media is data that can be changed in accordance with the game. That is to say, the game media is electronic data used in the game, and is data that can be acquired, owned, used, managed, exchanged, composed, strengthened, sold, discarded or gifted within the game by the user. For example, the game media includes image data and video data expressing cards, virtual currency, tickets, characters, avatars and the like. In addition, the game media includes arbitrary media data such as level information, status information, parameter information (physical strength value, fighting power and the like), ability information (skills, abilities, spells, jobs and the like), and the like that turns into cards, virtual currency, tickets, characters, avatars and the like. In addition, the objects include indexes such as text, icons, maps and the like.

The objects include specified objects capable of displaying information, such as information processing devices that exist in the virtual space in the game, such as television receivers, monitors connected to personal computers, smartphones and the like, and signboards, billboards and the like. In addition, the objects include selectable objects that can be selected through operations by the player P, and non-selectable objects, in the virtual space. Among the specified objects, a first specified object is, for example, an object on which first external information is positioned. In addition, among the specified objects, a second specified object is an object on which second external information is positioned.

The first external information is information displayed in association with the first specified object. The first external information is, for example, text data, a display providing notification of the contents and receipt of email or chats, strategy information for the game currently being played, search results for strategy information using a search site, outdoor weather information or the like. The second external information is information displayed without association to an object. The second external information is, for example, information including the real-space image imaged by the imaging device 40. The second external information may include, besides real-space images, text data or the like for displaying humidity information or temperature information detected by the various sensors installed along with the imaging device 40. Whether the various types of information are treated as the first external information or the second external information may be set in advance, or the player P may set this in advance.

The object information 22B includes object identifiers, object types and the positions of objects in the virtual space. The object types indicate whether or not the objects can be specified as the first specified object or the second specified object where the first external information or the second external information is to be positioned. The position of the object is the position of the object in the virtual space. The position of the object is updated by the controller 21 accompanying the progress of the game.

The game audio information 22C is one example of virtual-space information, and is information for outputting game audio to the HMD 10. The progress management unit 21B extracts information for outputting game audio to cause recognition by the player P from the game audio information 22C, and transmits the extracted information to the HMD 10.

The object specifying unit 21A references the object information 22B and specifies the specified object where the first external information is to be positioned, when the first external information is input. In addition, the object specifying unit 21A references the object information 22B and specifies the specified object where the second external information is to be positioned, when the second external information is input. Furthermore, when a real-space image input from the imaging device 40 is input as the second external information, the object specifying unit 21A specifies, as a third specified object displaying a virtual reality image, an object capable of information display among the real-space images, such as a television receiver, a monitor connected to a personal computer, an information processing device such as a smartphone, a bulletin board, a signboard or the like, that exists in the real space. Furthermore, the object specifying unit 21A specifies the information display region of the third specified object, that is to say the information display screen, specified from among the real-space images. The information display screen is the information display region in the television receiver, the monitor connected to a personal computer, the information processing device such as a smartphone, or the like. In addition, in the case of an object such as a bulletin board or a signboard, there is a region to write memos or the like or stick memo paper. In addition, it is possible to detect and specify from among the real-space images a predefined television receiver, monitor, smartphone, bulletin board, signboard or the like, and characteristics such as the color or shape or the like of these information display regions.

The progress management unit 21B manages the progress of the game. In addition, the first display processor 21C displays the first external information in the information display region of the first specified object in the virtual-space image. In addition, the second display processor 21D displays the second external information, including the real-space image imaged by the imaging device 40, on the virtual-space image or on the second object. The first display processor 21C can display the first external information and the first specified object as protruding or being sunken with respect to the virtual-space image, by changing the parallax information of the first specified object and the first external information with respect to the parallax information of the virtual-space image. This can be realized by changing the amount of deviation of the first external information and the first specified object for the right eye and the first external information and the first specified object for the left eye in relation to the amount of deviation in the virtual-space image for the right eye and the virtual-space image for the left eye. The second display processor 21D can also display the second external information and the second specified object as protruding or being sunken with respect to the virtual-space image, by changing the parallax information of the second external information and the second specified object with respect to the parallax information of the virtual-space image. Through this, it is possible to cause the first external information, the second external information, the first specified object, the second specified object and the like to stand out with respect to the virtual-space image, without being greatly affected by the size of the display with respect to the virtual-space image.

The acquisition unit 21E acquires the first external information and the second external information via a network.

The first external information is environment information such as outdoor weather information or strategy information of the game currently being played, or a display providing notification of the content or arrival of email, for example. When the first external information is an email, the acquisition unit 21E regularly accesses the mail server where email to the player resides. Or, when the game processing device 20 has a mail application or accesses a mail application, the acquisition unit 21E regularly accesses this mail application. Or, notification transmitted from the mail server or the mail application may be acquired without regularly accessing the mail server or the mail application. When email to the player P resides on a mail server 26 or the mail application, the email is downloaded and the fact that email was received, the sender, title or a portion of the body or the like is displayed in the information display region of the first specified object. The address data of the mail server 26 is recorded in the table 21F.

In addition, when the first external information is strategy information of the game currently being played, the acquisition unit 21E acquires the strategy information from a strategy site 27 where the currently played strategy information is explained. For example, the acquisition unit 21E is provided with the table 21F in which address data such as the Uniform Resource Locator (URL) of the strategy site 27 is recorded in association with game identification data that identifies the game. The acquisition unit 21E accesses the strategy site resident at the address data associated with the game identification data in the table 21F that matches the game identification data assigned to the game currently being played, and acquires the strategy information. For example, when the identification data is assigned to the current screen in the game currently being played, the strategy information of the part to which that identification data is assigned within the strategy site 27 is acquired. This URL can also be specified by the player.

When the first external information is environment information such as outdoor weather information or the like, the acquisition unit 21E accesses address data recorded in the table 21F, such as the URL of a weather site 28 in which weather information is posted, and acquires the external environment information. For example, when information related to a warning or caution is announced as weather information, the acquisition unit 21E acquires the warning information or caution information, and when there is a change in the weather (going from sunny to cloudy, or from rainy to sunny, or the like), the acquisition unit 21E acquires the weather information. The acquisition unit 21E uses the Global Positioning System (GPS) or the like, and acquires the current position information of where the game processing device 20 and the like are installed. In addition, current position information is stored in the device's memory by the player P. The acquisition unit 21E acquires the weather information of the current position information from the weather site 28.

The acquisition destination of the first external information is not limited to a mail server, a strategy site or a weather site. For example, acquisition destinations can be freely recorded in the table 21F in accordance with the personal preferences of the player P or other users.

The second external information is, for example, the real-space image imaged by the imaging device 40. In a case in which the imaging device 40 images the environment surrounding the player P, when the detector 42 detects a person, the acquisition unit 21E acquires the real-space image of the surrounding environment. In addition, in a case in which the imaging device 40 is an outdoor camera, when the detector 42 detects a person, the acquisition unit 21E acquires the real-space image of outdoors; and when the detector 42 detects falling rain and when the humidity or temperature exceeds a threshold value or has fallen, the acquisition unit 21E acquires the real-space image of outdoors. The imaging unit 21E may constantly acquire real-space images when imaging the environment surrounding the player P or when imaging the outdoors. In addition, related information related to the real-space image that expresses rainfall information, temperature information, humidity information or the like detected by a rainfall sensor, a humidity sensor or a temperature sensor as the detector 42 with text or figures may be included in the second external information.

The determination unit 21G determines whether or not the scene in the game in progress is at a timing such that the first external information or the second external information can be displayed, in accordance with that scene. For example, in the case of a role playing game or a simulation game, when a transition is made from one stage to the next stage or the like, in scenes in which important scenes are replayed as the story progresses, the first external information and the second external information should not be displayed. Through this, it is possible to make it so the player P does not overlook important scenes.

In addition, in the case of a battle game or a competition game, there are times when strategy information for defeating the opponent is necessary, such as in times of combat. In addition, such scenes are scenes in which the player P is easily immersed, and are also screens on which it is difficult to notice changes in the surrounding environment due to concentrating on the game. Hence, in such scenes, along with the first external information being displayed in the information display region of the first specified object, for example, the second external information is also displayed in the virtual-space image. Through this, the player can acquire the first external information and the second external information.

In addition, the determination unit 21G determines whether or not the external information acquired by the acquisition unit 21E is the first external information or the second external information. For example, when the first external information is input, the determination unit 21G makes it so the first external information can be displayed in the information display region of the first specified object. In addition, when the imaging device 40 has detected changes in the environment surrounding the player P and the second external information is input, the determination unit 21G makes it so the second external information can be displayed in the information display region of the second specified object or the virtual-space image. When the imaging device 40 detects a change in the surrounding environment, for example, when the first external information is displayed in the information display region of the first specified object, the determination unit 21G makes it so the real-space image of the surrounding environment can be additionally displayed in the information display region of the second specified object or the virtual-space image. Here, the first specified object and the second specified object may be the same object or may be differing objects.

In addition, when selectively displaying the first external information and the second external information, the determination unit 21G makes it so that the first external information or the second external information can be displayed with priority. In addition, when the first external information and the second external information are displayed, the determination unit 21G makes it so that one of the items of external information out of the first external information and the second external information is displayed (for example, larger) so as to stand out from other external information. For example, even when strategy information is displayed in the information display region of the first specified object during the game, when a real-space image imaging the environment surrounding the player P is input from the imaging device 40, the determination unit 21G makes it so that the real-space image can be displayed on the entire screen as the second external information, and the virtual-space image can be displayed in the information display region of the third specified object in the real-space image. In this case, the first specified object may be further displayed in the virtual-space image displayed in the information display region of the third specified object, and the first external information may be displayed in the information display region of the first specified object.

When there is a plurality of types of the first external information even among the first external information, the determination unit 21G determines the types thereof. For example, depending on the type in the first external information, a specific item of first external information can be displayed with priority in response to the game scene. For example, while playing the game, the strategy information of the currently played game that is the first external information is displayed with priority over other items of first external information (display of the receipt of email or weather information). Or, even in the middle of playing the game, the display of email that is first is displayed with priority over other items of first external information (game strategy information or weather information). Or, even in the middle of playing the game, weather information that is the first external information (in particular, information on warnings and cautions) is displayed with priority over other items of first external information (game strategy information or displays of email).

Even with the second external information, when there is a plurality of types of the second external information, the determination unit 21G determines the types thereof. When the imaging device 40 images the environment surrounding the player P and the outdoors, the determination unit 21G displays with priority the real surrounding image of one out of the real-space image of the surrounding environment and the real-space image of the outdoors. For example, even when a real-space image of the outdoors is displayed in the information display region of the second object or the virtual-space image, when there is a change in the environment surrounding the player P (for example, when a person is detected), the real-space image of the environment surrounding the player P is displayed with priority.

In this manner, priority level within the first external information, priority level within the second external information, and priority level between the first external information and the second external information may be defined in the game processing device 20 in advance, or may be set by the player P or another user.

[External Information Display Processing]

Figure 4:
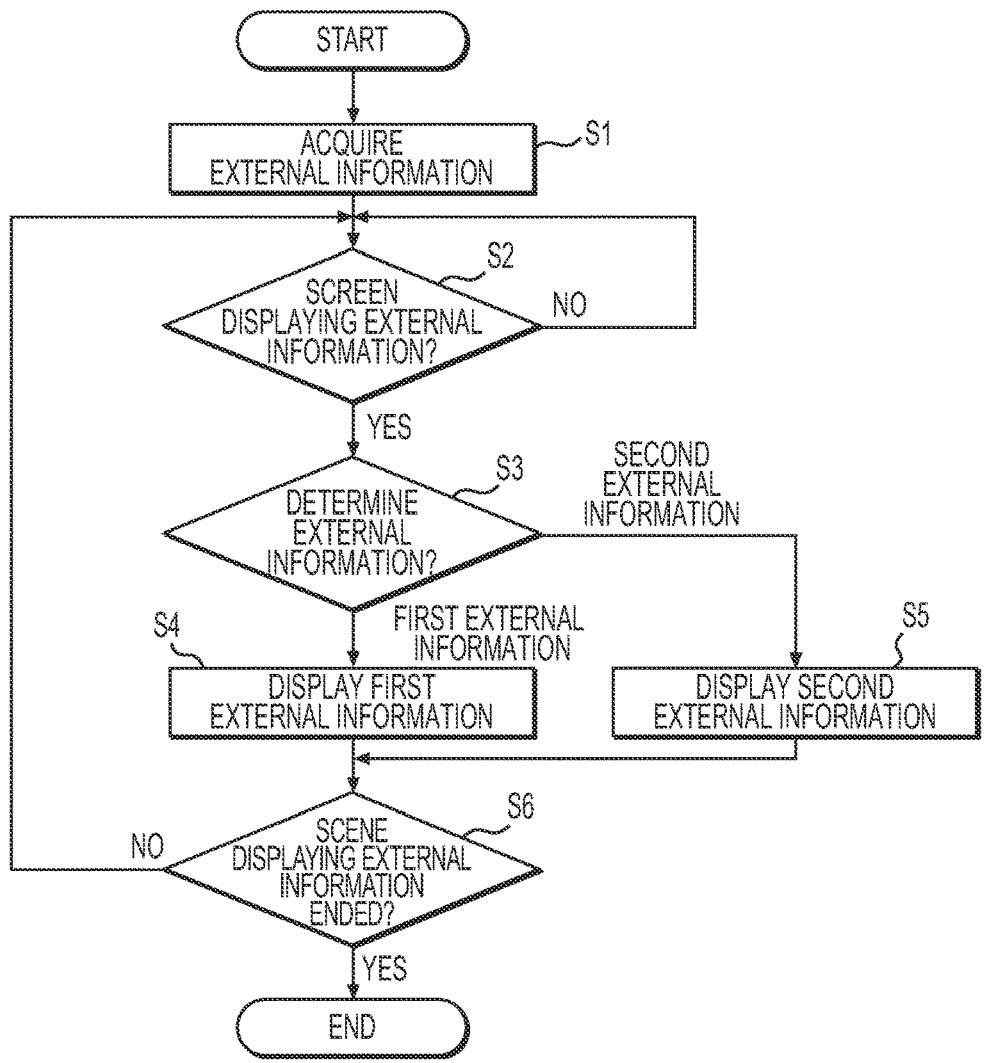
FIG. 4 is a flowchart of a data processing method.

As shown in FIG. 4, in step S1, the acquisition unit 21E acquires the first external information and the second external information via a network. In step S2, the determination unit 21G determines whether or not the scene in the game progress is at a timing such that the first external information and the second external information can be displayed, in accordance with that scene. Whether or not the scene at the point in time of the determination is at a timing such that the first external information and the second external information can be displayed is determined by the determination unit 21G with reference to the game progress managed by the progress management unit 21B. For example, the determination unit 21G determines whether or not to display the first external information and the second external information by referencing identification information indicating whether or not it is possible to display the first external information and the second external information related to the progress of the game managed by the progress management unit 21B.

For example, the identification information indicating whether or not the first external information and the second external information can be displayed is one out of (i) able to display both the first external information and the second external information, (ii) able to display only the first external information or (iii) able to display only the second external information, in accordance with the scene. When described in relation to the game scenes, for example a scene where it is desirable to not interfere with the game experience in the virtual space, the identification information can have the content of display being possible only for first external information with high priority level, so that second external information with low priority level is not displayed. To state this further, this can be made to have content that makes it possible to display only strategy information out of the first external information.

In the above-described embodiment, in step S2 a determination is made as to whether or not the scene is at a timing such that the first external information or the second external information can be displayed, in accordance with the game scene. Instead of this, the determination of whether or not the timing allows display of the first external information or the second external information may be made based on whether or not the player P is operating. Whether or not the player P is operating can be determined on the basis of the detection results of the sensor 12 of the HMD 10, or the detection results of the tracking information detector 32 of the operating device 30. When the player P is operating, the player cannot pay attention to the first specified object or the second specified object. In addition, in conjunction with images that move in conjunction with the orientation of the head of the player P, a sense of incompatibility arises when the real-space image 102R is statically displayed in a portion of the screen. Thus, when the player P is moving, the first external information and the second external information become difficult to look at (difficult to pay attention to), so control may be exerted so as to not display the first external information or the second external information.

The determination unit 21G advances to step S3 when the first external information and the second external information can be displayed, and repeats step S2 when this is not a scene where such display is possible. In step S3, the determination unit 21G determines the type of external information. Specifically, the determination unit 21G determines whether the external information acquired by the acquisition unit 21E is the first external information or the second external information. In addition, the determination unit 21G determines the type of the first external information. Furthermore, the determination unit 21G determines the type of the second external information.

In step S4, the first display processor 21C displays the first external information in the information display region of the specified object in the virtual-space image. At this time, the first display processor 21C determines whether or not the first specified object is included in the virtual space displayed on the display 13. When the first specified object is displayed, the first external information is displayed superimposed on a prescribed extent of the first specified object. In addition, when there is input of a plurality of items of first external information, the first display processor 21C displays a specific item of the first external information with priority on the first specified object.

In step S5, the second display processor 21D displays the second external information in the virtual-space image. At this time, the second display processor 21D determines whether or not the second specified object is included in the virtual space displayed on the display 13. When the second specified object is displayed, the second external information is displayed superimposed on a prescribed extent of the second specified object. In addition, when there is input of a plurality of items of second external information, the second display processor 21D displays a specific item of the second external information with priority on the second specified object.

In step S6, the determination unit 21G determines whether or not the screen displaying the first external information or the second external information has ended, and when this has not ended, repeats the process from step S2. The time at which the screen displaying the first external information or the second external information ends is, for example, the time at which the game ends. In addition, this is a time at which a transition has been made to a screen where display of the first external information or the second external information is not desirable, such as a transition to a screen that is important in the story.

Output Example

In the following description of an output example, the description takes as an example a game that progresses while the player character communicates with a virtual character.

Figure 5:
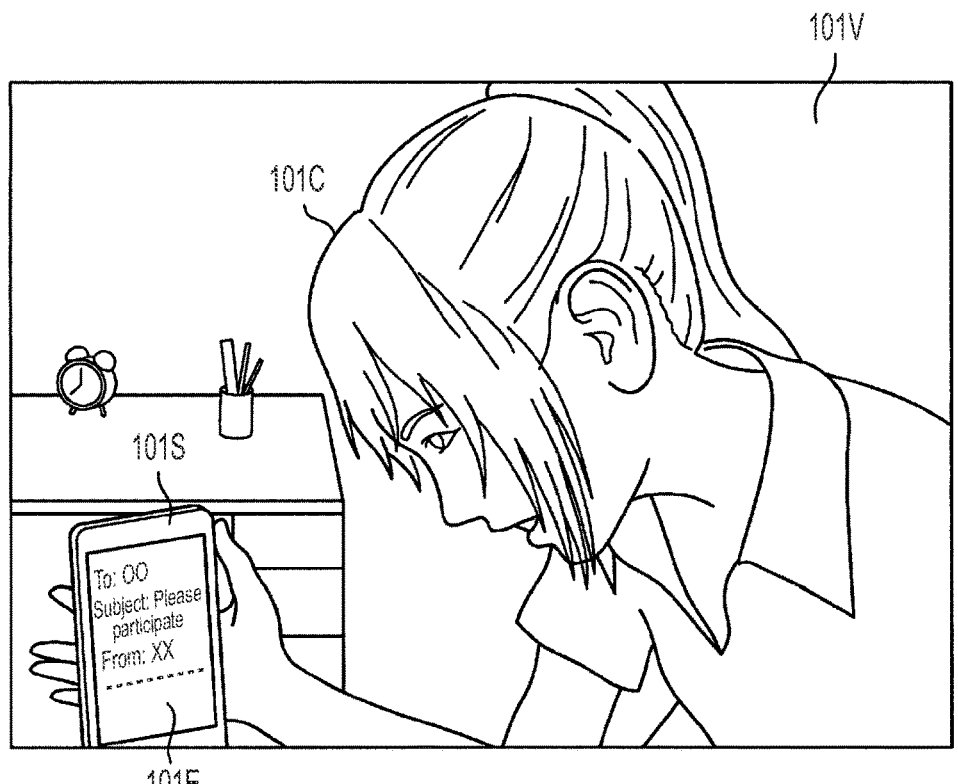
FIG. 5 is a drawing showing a screen superimposing and displaying an email as first external information on a first specified object that is a smartphone in a virtual-space image.

FIG. 5 shows a virtual-space image 101V displayed on the display 13 of the HMD 10. The virtual character in the virtual-space image 101V is a character object 101C, and a smartphone is a first specified object 101S. The first specified object 101S is specified by the object specifying unit 21A with reference to the object information 22B, and in the information display region thereof, an email 101E sent with the player P as the addressee is displayed as the first external information. The screen in FIG. 5 is such that the email 101E is acquired by the acquisition unit 21E as external information (step S1), the acquisition time is a scene where display of the first external information is possible (step S2), and as a result of this being determined to be the first external information (step S3, S4), the email 101E is displayed superimposed on the first specified object 101S of the virtual-space image 101V. The player P can pay attention to the first specified object 101S and read the email 101E. This need not be an email, and may be a message addressed to the player in a social networking service. In this manner, when the first external information is displayed on the first specified object 101S, it is possible to prevent interruption of the feeling of immersion in the game.

The first display processor 21C may erase the email 101E from the first specified object 101S after a prescribed time has elapsed, or may continue the display until the next item of first external information is acquired. After erasure, a default image in the game is displayed in the information display region. In addition, the display may continue until an item of first external information with higher priority level than the email 101E is acquired. For example, when there is a change in the weather information (particularly warning or caution information), the first display processor 21C displays the weather information on the first specified object 101S with preference over the email 101E.

Figure 6:
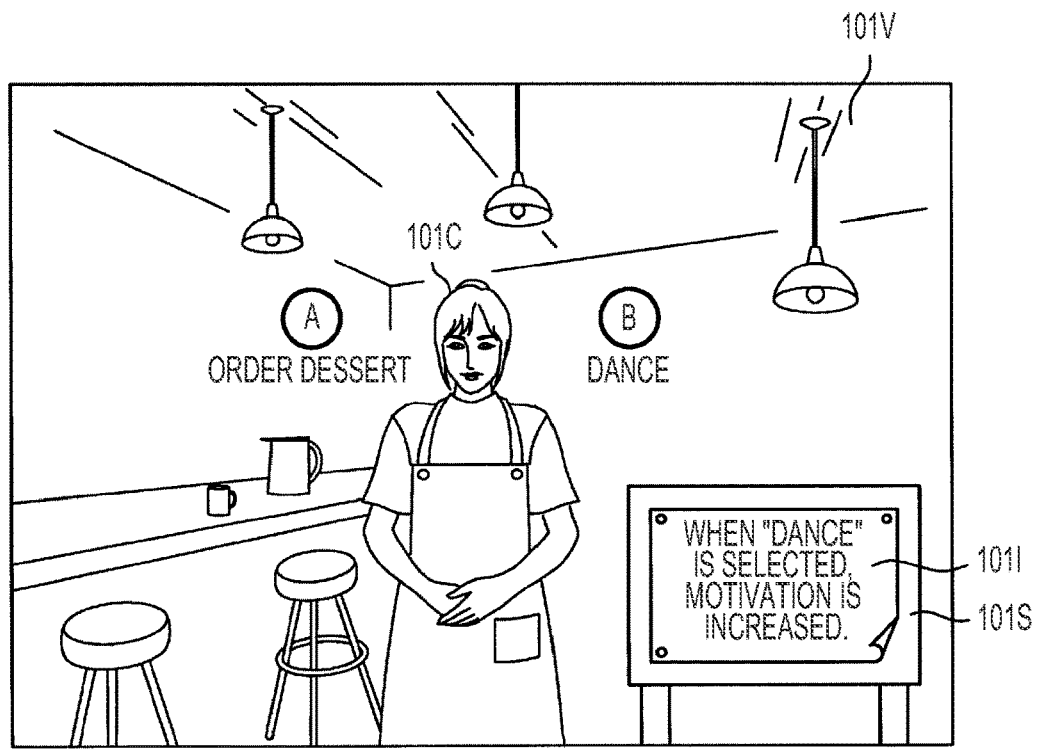
FIG. 6 is a drawing showing a screen that responds to questions from character objects and superimposes and displays strategy information as first external information on a first specified object that is a bulletin board.

FIG. 6 is a screen where the player P makes a selection, and is a screen in which the character object 101C asks the player P by audio or the like whether the player (A) wants to order dessert or (B) wants the character object 101C to dance. Furthermore, the player P can input a selection signal in response to the vocal question from the character object 101C by shaking the head vertically (generating an operating signal indicating selection) or shaking the head sideways (generating an operating signal for non-selection). In the screen of FIG. 6, strategy information 101I is displayed on the first specified object 101S that is the object of a bulletin board, as the first external information. The strategy information 101I is information acquired by the acquisition unit 21E and determined as first external information by the determination unit 21G.

Instead of the strategy information 101I, search results for game strategy information made using a search site may be displayed. The search keyword is described in conjunction with the progress of the game, in the game program for example. Or, the search keyword is input by the player P by audio through a microphone, or by a keyboard or the like. Or, the game processing device 20 accomplishes a search by outputting the title or the like of the game the player P is playing to a search site. The search results are displayed on the first specified object 101S. When the player P selects one out of these search results, a page of the selected website is displayed on the first specified object 101S. In this case, the first specified object 101S may be enlarged so that the web page of the selected website is displayable.

The first specified object 101S that is a bulletin board is such that at the transition to the screen of FIG. 6, the strategy information 101I is positioned on the first specified object 101S that is the bulletin board, and is displayed as a popup superimposed on the virtual-space image 101V. Or, the first specified object 101S that is the bulletin board is erased, and the strategy information 101I is instead displayed on the first specified object 101S that is a smartphone. The strategy information 101I is extracted from the part to which the identification data of the screen in FIG. 6 is assigned in the strategy site 27. Through this, the player P can reference the strategy information 101I and make reference when selecting (A) and (B).

The first display processor 21C erases the first specified object 101S displaying the strategy information 101I when the selection of (A) and (B) is finished. In addition, the first display processor 21C displays the strategy information 101I in place of the weather information, even if, up to that point, the weather information has been displayed on the first specified object 101S. In the case of the strategy information being displayed interrupting the display of weather information on the first specified object 101S, when the display of the strategy information ends, the original weather information is displayed.

The strategy information 101I may be displayed on the screen of the smartphone that is the first specified object 101S, in place of the first specified object 101S that is the bulletin board. In FIG. 6, the smartphone that is the first specified object 101S is not displayed, but in this case, a smartphone may be displayed screen-up on the counter, or may be held in the hand of the character object 101C. Furthermore, the strategy information 101I can be displayed on the screen of this smartphone. Moreover, one of the search results displayed on the screen of that smartphone can be selected. For example, the player P can record in advance in the game processing device 20 the URL of "strategy information furnishing site A" and the URL of "strategy information furnishing site B", and a display allowing selection of either out of the "strategy information furnishing site A" and the "strategy information furnishing site B" is done on the screen of the smartphone that is the first specified object 101S in the virtual space. When one of the websites is selected by an input operation from the operating device 30 by the player P, the game processing device 20 accesses the URL of that website and displays the strategy information 101I of the selected website on the screen of the smartphone that is the first specified object 101S.

In addition, a plurality of the first specified object 101S may be displayed in the virtual space image 101V, and for example the bulletin board and the smartphone may be displayed simultaneously, or a plurality of smartphones may be displayed, or a plurality of bulletin boards may be displayed. In this kind of example, it is possible to display search results that are first external information on one of the first specified objects 101S, and to display the strategy information 101I of the strategy information furnishing site that is the first external information on another of the first specified objects 101S. For example, when a smartphone and a bulletin board are displayed as first specified objects 101S, either of the "strategy information furnishing site A" and the "strategy information furnishing site B" can be selectably displayed on the smartphone screen, for example. When the "strategy information furnishing site A" is selected by an input operation from the operating device 30 by the player P, the game processing device 20 accesses the URL of that website and displays on the bulletin board that is the first specified object 101S the strategy information 101I of the selected "strategy information furnishing site A". When the strategy information 101I of the "strategy information furnishing site A" is displayed on the bulletin board that is the first specified object 101S, the player P, by selecting the "strategy information furnishing site B" on the screen of the smartphone that is the first specified object 101S, can switch the bulletin board that is the first specified object 101S from the strategy information 101I of the "strategy information furnishing site A" to the strategy information 101I of the "strategy information furnishing site B". In this kind of example, it is possible to easily switch among a plurality of strategy information furnishing sites with a simple operation.

When there is a third first specified object 101S (for example, a bulletin board), the strategy information 101I of the "strategy information furnishing site A" is displayed on the second first specified object 101S (for example, a bulletin board). Moreover, when the "strategy information furnishing site B" is selected on the screen of the smartphone that is the first specified object 101S, the strategy information 101I of the "strategy information furnishing site B" can be displayed on the third first specified object 101S (for example, a bulletin board). That is to say, it is possible to simultaneously display the strategy information 101I of the "strategy information furnishing site A" and the strategy information 101I of the "strategy information furnishing site B".

Figure 7:
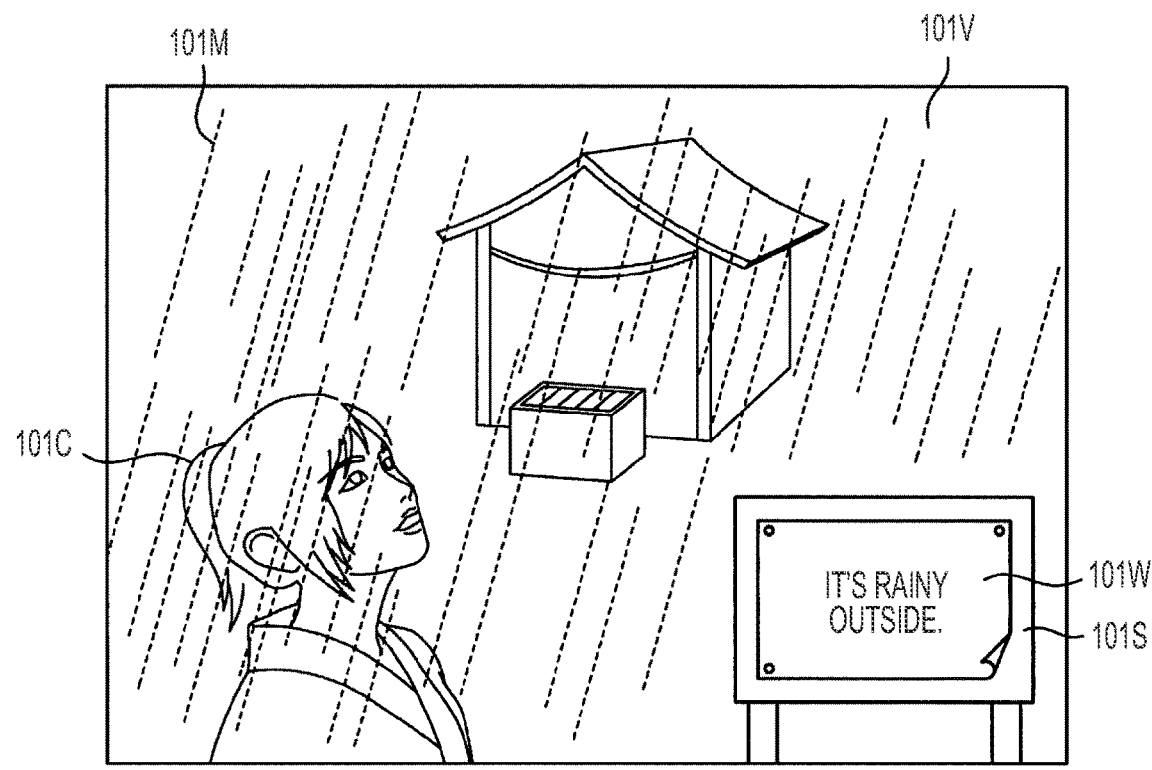
FIG. 7 is a drawing showing a screen that superimposes and displays an object that is the outside conditions (rain) on the virtual-space image, and also superimposes and displays weather information as first external information on a first specified object that is a bulletin board.

FIG. 7 is a drawing showing a screen of the state where the character object 101C is outdoors. In the screen of FIG. 7, weather information 101W is displayed as the first external information in the information display region of the first specified object 101S that is a bulletin board. The weather information 101W is acquired by the acquisition unit 21E from the weather site 28 (step S1), the acquisition time is a scene where the first external information can be displayed (step S2), and as a result of being determined as the first external information (step S3, S4), the weather information 101W is displayed on the first specified object 101S. The weather information 101W shows that the current weather is rain, and "It's rainy outside" is displayed by text data as the weather information 101W as the first external information. In addition, the first display processor 21C displays weather mark objects 101M indicating rain (for example, rain drops) superimposed on the virtual-space image 101V. By displaying this kind of weather mark object 101M, it appears that rain is falling in the virtual space in synchronization with the actual outdoor conditions. Furthermore, it is possible to associate the first external information and the virtual-space image. If it is sunny, weather mark objects indicating the sun, or shadows and sunshine, may be displayed, and if it is cloudy, weather mark objects of clouds may be displayed.

When the settings are such that the weather information 101W is displayed on the first specified object 101S, when the weather information changes such as going from sunny to cloudy, or from rainy to sunny, the display contents of the weather information 101W change. For example, the acquisition unit 21E constantly or periodically accesses the weather site 28 and detects whether there has been a change in the weather information, and when there is a change, acquires the post-change weather information. In addition, a weather forecast (for example, a weather forecast for every hour from the present time) may be displayed on the first specified object 101S. In addition, when the screen has transitioned from the screen of FIG. 7 to the screen of FIG. 6, a change is made from the weather information 101W to the strategy information 101I in the first specified object 101S. The weather information 101W may be erased after being displayed for a prescribed time, or may continue to be displayed until the next first external information is acquired.

Figure 8:
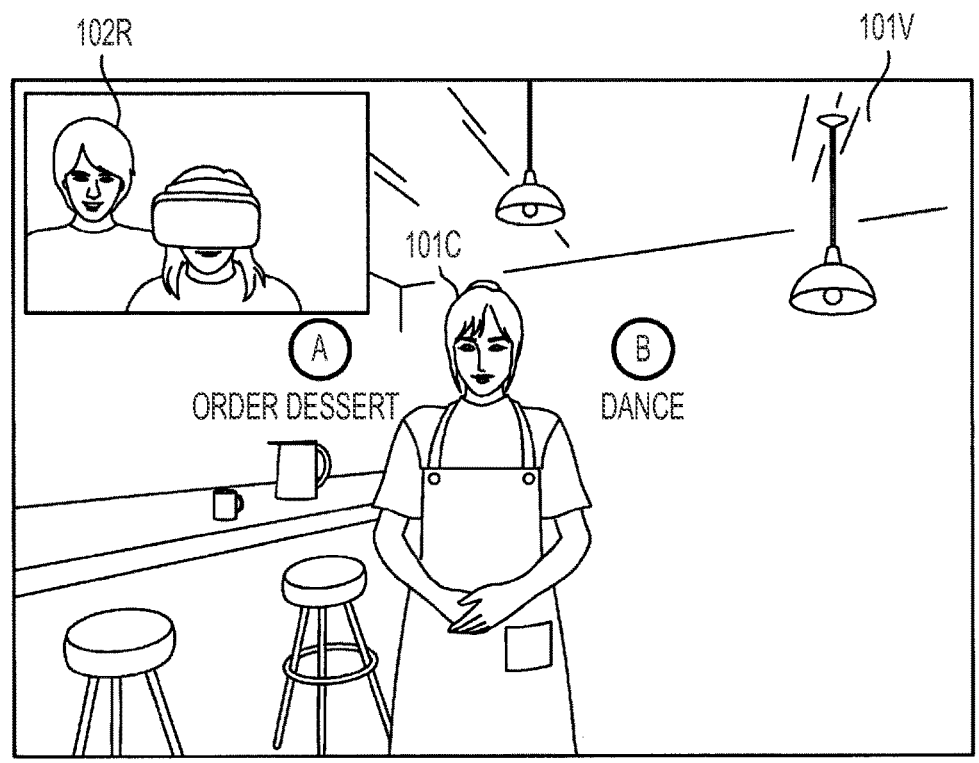
FIG. 8 is a drawing showing a screen that responds to questions from character objects, and superimposes and displays the real-space image of the player surroundings as the second external information.

In FIG. 8, the second external information is displayed superimposed on the virtual-space image 101V, in place of the first external information in the screen of FIG. 6. That is to say, in FIG. 8, the first external information is not displayed. In FIG. 8, a real-space image 102R of the surrounding environment imaged by the imaging device 40 that images the environment surrounding the player P is displayed as the second external information, superimposed on the virtual-space image 101V. Here, the second external information is not displayed on the second specified object. The screens of FIG. 6 and FIG. 8 are screens that force the player P to make a selection in the course of the game, and the player P is often focused on and immersed in the game. For example, the imaging device 40 outputs the real-space image 102R to the acquisition unit 21E regardless of the output of the detector 42. Furthermore, when the transition has been made to the screens of FIG. 6 and FIG. 8, the second display processor 21D displays the real-space image 102R superimposed on the virtual-space image 101V, so that the player P can see and confirm the surrounding environment. In addition, regardless of the screen of FIG. 8, for any screen within the game, when the detector 42 detects a person in the surrounding environment, the second display processor 21D displays the real-space image 102R acquired by the acquisition unit 21E as the second external information, superimposed on the virtual-space image 101V. Consequently, the player P can check the second external information that is important information even when immersed in the game.

Figure 9:
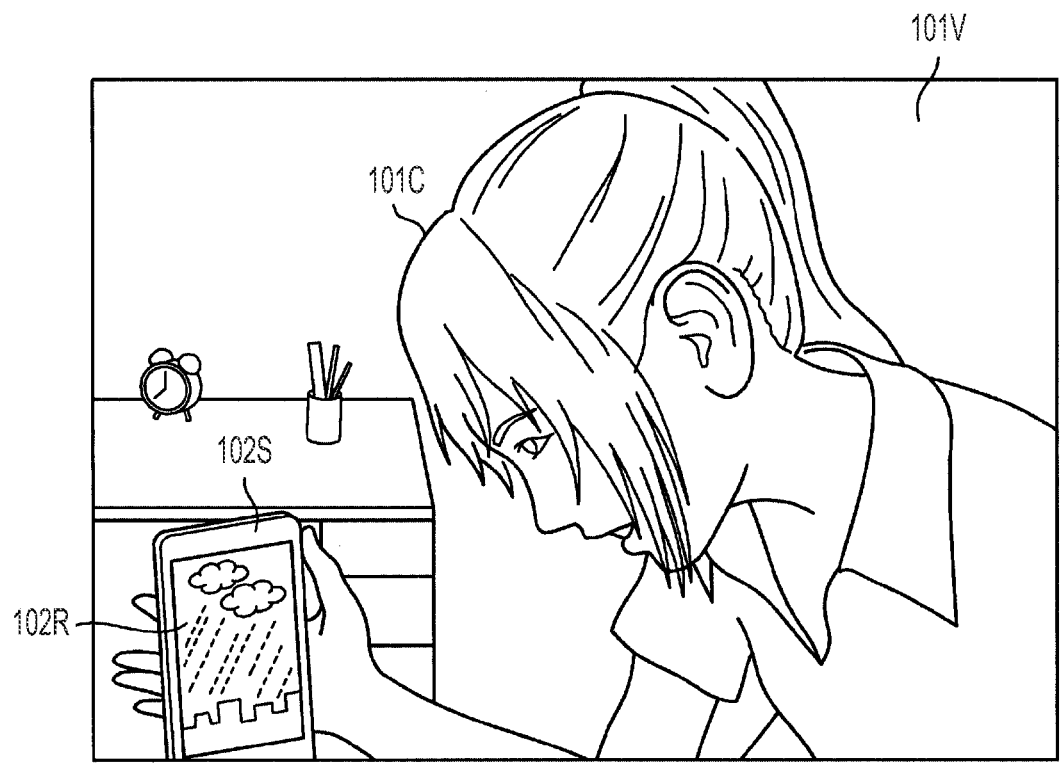
FIG. 9 is a drawing showing a screen that superimposes and displays an outside real-space image as the second external information on a second specified object that is a smartphone in the virtual-space image.

FIG. 9 shows the second external information displayed superimposed on the virtual-space image 101V in place of the first external information in the screen shown in FIG. 5. That is to say, in FIG. 9, the first external information is not displayed. In FIG. 9, the smartphone becomes the second specified object 102S, and the real-space image 102R of the outdoors imaged by the outdoor camera of the imaging device 40 is displayed on the second specified object 102S. The smartphone or the like is a specified object that can be the first specified object or the second specified object in the virtual-space image 101V. The imaging device 40 outputs the real-space image 102R to the acquisition unit 21E regardless of the output of the detector 42. The second display processor 21D displays the real-space image 102R superimposed on the second specified object 102S of the virtual-space image 101V, so the player P can see and confirm the state of the outdoors (in FIG. 9, the state of rain).

Figure 10:
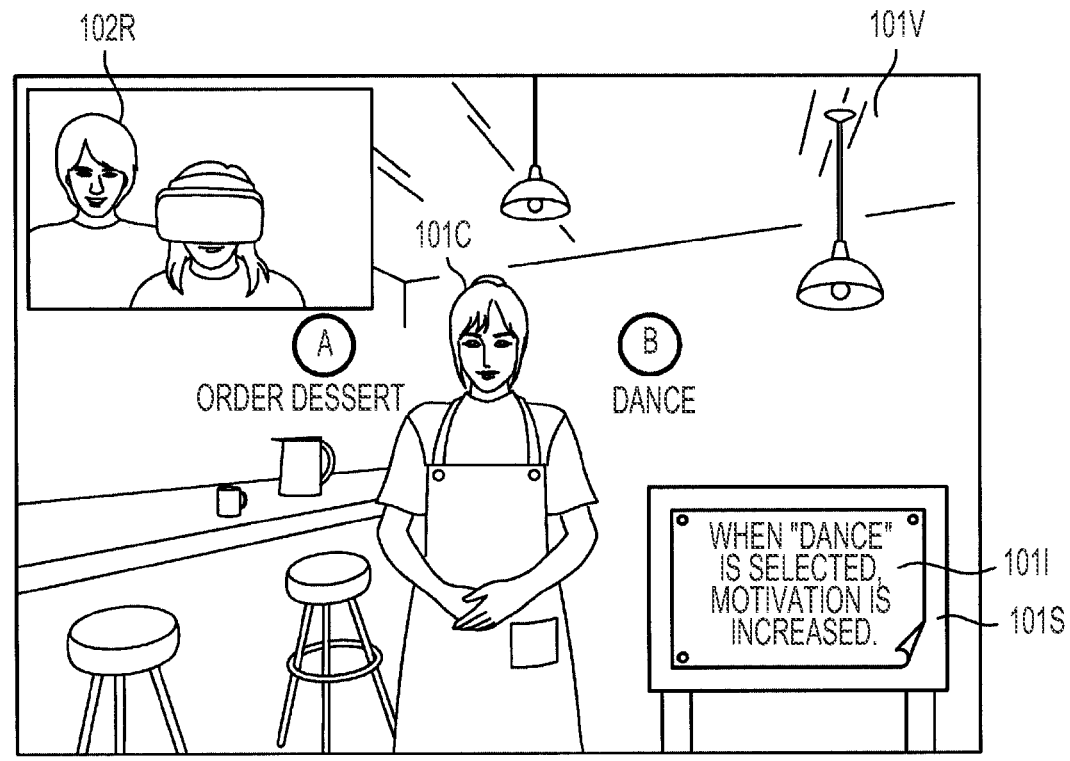
FIG. 10 is a drawing showing a screen that responds to a question from a character object, the screen superimposing and displaying strategy information as first external information on a first specified object that is a bulletin board and also superimposing and displaying a real-space image of the player's surroundings as second external information.

In FIG. 10, the first external information displayed on the screen of FIG. 6 and the second external information displayed on the screen of FIG. 8 are displayed superimposed on the virtual-space image 101V. The screens of FIG. 6, FIG. 8 and FIG. 10 are screens that force the player P to make a selection in the course of the game, and often the player P is focused on and immersed in the game. Hence, the first display processor 21C displays the strategy information 101I as the first external information, and the second display processor 21D displays the real-space image 102R of the surrounding environment as the second external information, superimposed on the virtual-space image 101V. Through this, the player P can see and confirm the surrounding environment while referencing the strategy information 101I. In the example of FIG. 10, the second external information is not displayed on the information display region of the second specified object such as a bulletin board.

Figure 11:
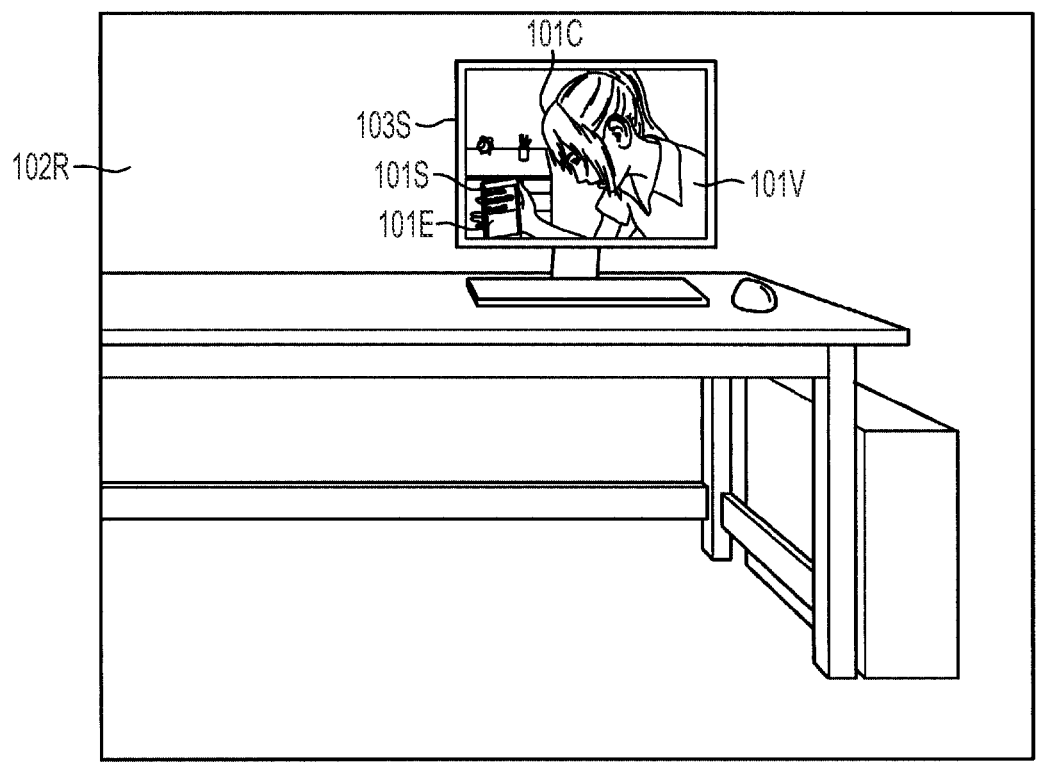
FIG. 11 is a drawing showing a screen that superimposes and displays a virtual-space image in an information display region that is a third specified object detected from within a real-space image as second external information.

FIG. 11 is an example in which the second external information is displayed larger than the virtual-space image 101V. For example, when a virtual-space image 101V (the first external information may be displayed or not displayed) such as that shown in FIG. 5 is displayed on the whole display screen, when there is a change in the environment surrounding the player P, the determination unit 21G switches to a screen like that shown in FIG. 11. When the real-space image 102R of the player P is input as the second external information, the second display processor 21D displays this real-space image 102R on the entire display region. In conjunction with this, the object specifying unit 21A detects television receivers, monitors, smartphones, bulletin boards, signboards and the like, and characteristics such as the shape, color or the like of such, in the real-space image 102R, and specifies the third specified object 103S. Furthermore, the virtual-space image 101V of the game currently being played is displayed in the information display region of the third specified object 103S. The first specified object 101S may be further displayed in the virtual-space image 101V displayed in the information display region of the third specified object 103S, and the first external information may be displayed in the information display region of the first specified object 101S, or only the first specified object 101S may be displayed, without the first external information being displayed. Here, the email 101E is displayed as the first external information on the first specified object 101S that is a smartphone.

The virtual-space image 101V can be displayed superimposed on a specific region such as a corner of the real-space image 102R, and not displayed on the third specified object 103S of the real-space image 102R, In addition, it is possible to cause the virtual-space image to be displayed as protruding or sunken with respect to the real-space image, by causing the parallax information of the virtual-space image to differ from the parallax information of the real-space image. This can be realized by changing the amount of deviation between the virtual-space image for the right eye and the virtual-space image for the left eye in comparison to the amount of deviation between the real-space image for the right eye and the real-space image for the left eye. Through this, it is possible to cause the virtual-space image to stand out in the real-space image, without the virtual-space image being affected very much by the size of the display, with respect to the real-space image.

Figure 12:
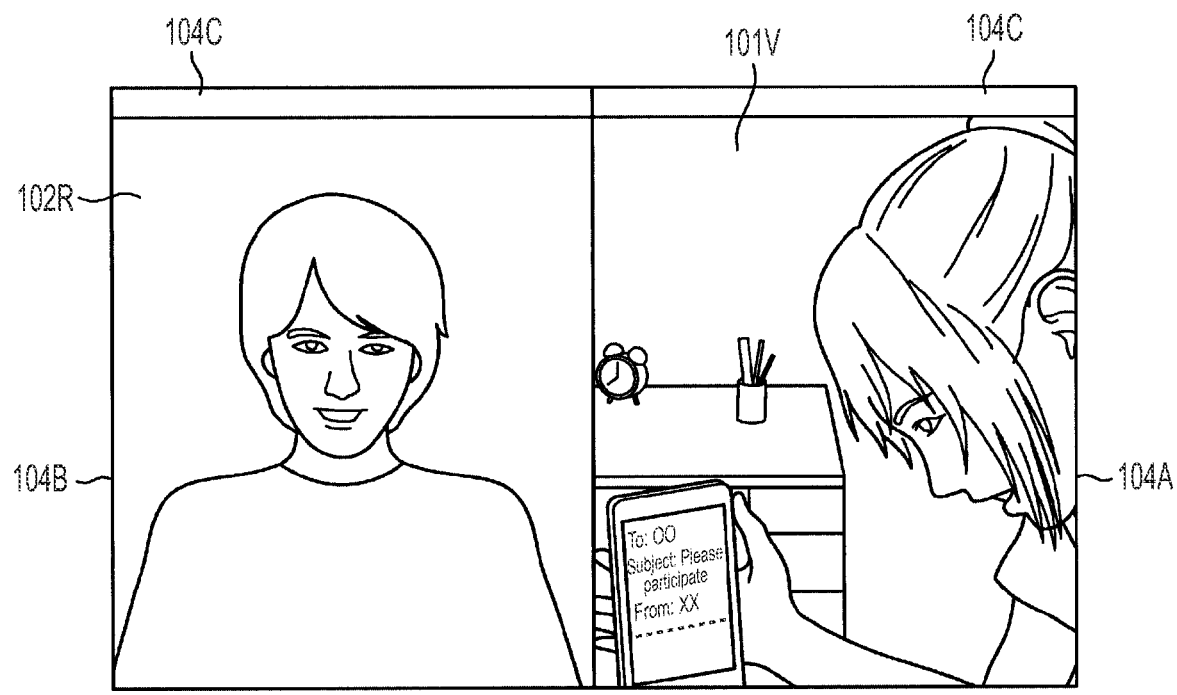
FIG. 12 is a drawing showing a screen that splits the display screen into a first region and a second region, and displays a virtual-space image of the game in the first region and displays a real-space image as the second external information in the second region.

FIG. 12 has the display screen split into a first region 104A and a second region 104B, and the virtual-space image 101V of the game is displayed in the first region 104A and the real-space image 102R is displayed as the second external information in the second region 104B. That is to say, from FIG. 5 through FIG. 11, the first specified object 101S and the email 101E, the strategy information 101I and the weather information 101W as the first external information are displayed superimposed on the virtual-space image 101V. In FIG. 11, the third specified object 103S is displayed superimposed on the real-space image 102R as the second external information, and moreover, the virtual-space image 101V is displayed superimposed on the third specified object 103S. In contrast, in FIG. 12, the display region is split in two, and the virtual-space image 101V is displayed in the first region 104A and the real-space image 102R is displayed in the second region 104B, without superimposition. In the virtual-space image 101V displayed in the first region 104A, the first specified object 101S and the first external information are displayed.

The sizes of the first region 104A and the second region 104B may be the same, or one of the regions may be larger than the other region. In addition, the first region 104A and the second region 104B may be configured in a window 104C, or the window 104C need not be provided. In addition, the display screen may be split up and down, and the top display region may be made the first region 104A and the bottom display region may be made the second region 104B. In addition, because one display screen is split into two regions, each display region becomes narrow, creating the fear that the entire region of the virtual-space image 101V cannot be displayed in the first region 104A and that the entire region of the real-space image 102R cannot be displayed in the second region 104B. In such cases, the right and left edges or the top and bottom regions of the virtual-space image 101V may be omitted. Or, when the entire region of the virtual-space image 101V cannot be displayed, this may be detected and scroll bars for scrolling up and down or left and right may be displayed in the first region 104A and the second region 104B. In this case, by operating the scroll bars, it is possible to scroll through the images of the first region 104A and the second region 104B, making it possible to confirm the entire images through scrolling.

[Hardware Configuration]

A hardware configuration of the game processing device 20 of this embodiment will be described with reference to FIG. 13.

Figure 13:
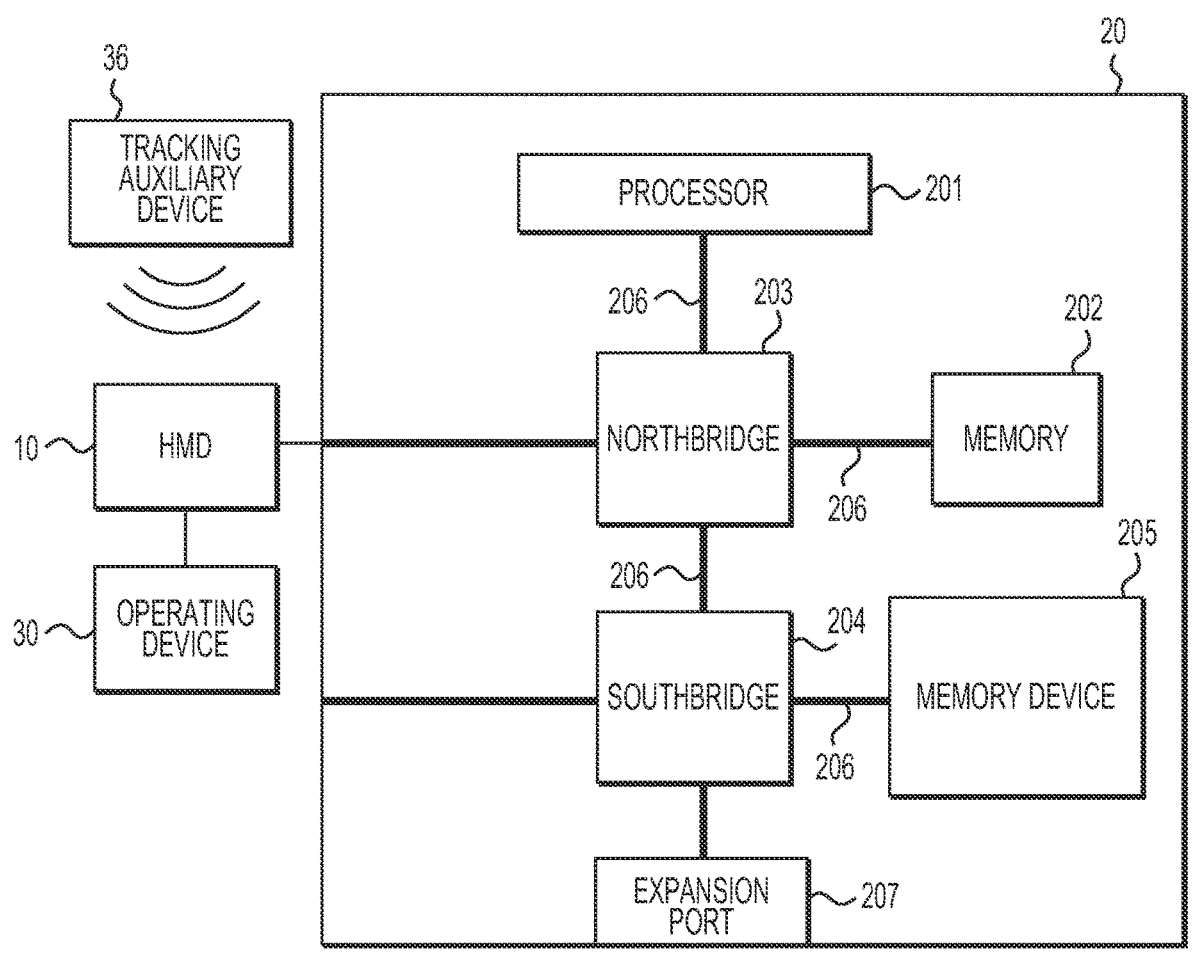
FIG. 13 is a drawing showing a hardware configuration of a game processing device.

FIG. 13 is a drawing showing an example of the game processing device 20. The game processing device 20 is a desktop personal computer, a notebook personal computer, a personal digital assistant (PDA), a server, a commercial or household game system, another type of computer, or the like. The configuration shown in FIG. 13 and the connection relationships in this configuration are one example.

The game processing device 20 includes a processor 201 and a memory 202. In addition, the game processing device 20 includes a northbridge 203, a southbridge 204 and a memory device 205. The processor 201, the memory 202 and the bridges 203 and 204 are connected to each other using various types of buses 206. The processor 201 controls the progress of the game and also outputs images to the HMD 10 or the like connected to the northbridge 203. The game processing device 20 may include a plurality of processors and may include a plurality of memories.

The memory 202 is connected to the northbridge 203 and outputs information related to game processing to the processor 201. For example, the memory 202 is a volatile memory device or a non-volatile memory device. In addition, the memory 202 is a memory medium such as a magnetic or optical disc or the like.

The memory device 205 is connected to the southbridge 204 and outputs information related to game processing to the processor 201. For example, the memory device 205 is a hard disk device, an optical disk device, flash memory or other memory device.

The northbridge 203 is connected to the HMD 10. The southbridge 204 is connected to an expansion port 207. The expansion port 207 may include various types of communication ports (e.g. USB, Bluetooth®, Ethernet®, wireless Ethernet), and may be connected to an input/output device such as a keyboard, a mouse, a network device or the like.

In the above-described configuration, the processor 201, the memory 202 and the northbridge 203 correspond to the controller 21, and the memory 202 and the memory device 205 correspond to the memory unit 22.

As described above, with this embodiment the following effects are obtained.

(1) With the game processing system, at least one item of external information out of the first external information and the second external information is displayed by the display processor. Accordingly, the player P can confirm with his eyes at least one item of external information out of the first external information and the second external information even when wearing the HMD 10 and immersed in the game. The second external information includes the real-space image, so the player P, even when immersed in the game, can easily see and confirm that a person has approached from the real-space image of the surrounding environment, and in addition the player P, even when immersed in the game, can see and confirm the state of the outdoors from the real-space image of the outdoors, or the like. In addition, the first external information is email, or strategy information or weather information, so the player P can easily acquire information closely related to the player.

(2) When a change is detected in the real-space image of the second external information, this information is displayed along with the virtual-space image. Accordingly, the second external information is not constantly displayed, and is displayed at appropriate times. Accordingly, this does not become an impediment to the player P playing the game.

(3) The second external information including the real-space image is displayed superimposed on the virtual-space image of the game, so it is possible to prevent the display region of the virtual-space image from becoming narrow. In addition, the real-space image is displayed relatively small such as in a corner region of the virtual-space image, so it is possible to prevent obstruction of game play.

(4) By displaying the real-space image of the second external information in the information display region of the second specified object included in the virtual-space image comprising one scene of the game, it is possible to display the real-space image without a sense of incompatibility in the virtual-space image.

(5) In the screen of FIG. 11, the virtual-space image 101V is displayed inside the real-space image 102R. Accordingly, it is possible to cause the player P to notice the real-space image 102R, and by displaying the real-space image 102R large, it is possible to prevent the virtual-space image 101V from not being visible, and to prevent the game from being interrupted.

(6) In the screen of FIG. 11, the third specified object 103S is specified from inside the real-space image 102R, and the virtual-space image 101V is displayed in the information display region of the third specified object 103S. Accordingly, it is possible to display the virtual-space image 101V without a sense of incompatibility in the real-space image 102R.

(7) The display region displays the virtual-space image 101V in the first region 104A and displays the real-space image 102R in the second region 104B, so it is possible for the player P to easily see both images.

(8) By registering a plurality of acquisition destinations for the first external information in the table 21F, it is possible to easily acquire the first external information and display such on the first specified object 101S. In addition, it is possible to display a plurality of types of information as the first external information.

(9) When a plurality of types of the first external information is input, it is possible to display any of the items of first external information with priority. For example, strategy information for the game currently being played can be displayed with priority over other types of first external information (a display of the receipt of email, or weather information).

(10) It is possible to display with priority any of the items of external information among the first external information and the second external information. For example, by making it so that information other than the game is not excessively displayed to the player P during the game, it is possible to control selective display of the first external information and the second external information. In such cases as well, either type of external information can be displayed with priority. For example, when the first external information is displayed in the information display region of the first specified object, when a change in the surrounding environment, for example, is detected by the imaging device 40, the real-space image of the surrounding environment can be additionally displayed in the information display region of the second specified object or the virtual-space image. Through this, it is possible to notify the player, with priority, that a person has entered the surroundings.

(11) When a plurality of types of second external information is input, it is possible to display any of the items of second external information with priority. For example, it is possible to display with priority one of the real surrounding images out of the real-space image of the surrounding environment or the real-space image of the outdoors. More specifically, even when displaying the real-space image of the outdoors in the information display region of the second specified object or the virtual-space image, when there is a change in the surrounding environment of the player P (for example, a person is detected), the real-space image of the surrounding environment of the player P can be displayed with priority.

The above-described embodiments can be altered as below.

The imaging device 40 that acquires the second external information may be only one out of an indoor camera installed near the player P indoors or an outdoor camera. In addition, the outdoor camera may be provided with a rainfall sensor, a humidity sensor, a temperature sensor or the like, and when installed nearby, the temperature information, humidity information and the like therefrom may be output as text or figures to the real-space image as the second external information.

As the types of the second external information, there may be one type. For example, only imaging of the surroundings of the player P indoors may be done, or only the outdoors may be imaged. In addition, as the second external information, the real-space image may be included, and the location of that real-space image need not be near the player P and need not be outside of the building where the player P is.

The first external information is not limited to email information, game strategy information or weather information. Besides these, the first external information may be video of a recorded television program or video of a television broadcast. In addition, this may also be video information of an artist or the like stored on a recording medium. Such information may be input as a replacement for at least one out of email information, game strategy information and weather information. In addition, the first external information that can be displayed with figures such as weather information or the like may be displayed with figure objects such as a sunny mark, a rainy mark or the like.

Determination of the types of first external information can be done by determining identifying data appended to address data recorded in the table 21F, and can also be identified by the address data itself. In addition, ranking data indicating level of importance may be appended to each item of first external information, and the first external information with a high level of importance may be displayed with priority on the first specified object. The level of importance may be defined in advance by each acquisition destination or the game processing device 20, or may be set by the player P or another user.

Determination of the types of second external information can be done by making a determination according to identifying data of installed imaging units. In addition, ranking data indicating level of importance may be appended to each item of second external information, and second external information with a high level of importance may be displayed with priority. The level of importance may be defined in advance in the game processing device 20, or may be set by the player P or another user.

Identification of the first external information and the second external information can be done, for example, by identifying the addresses of the input port for the first external information and the input port for the second external information in the game processing device 20 (identifying data). In addition, ranking data indicating level of importance may be appended to first external information and the second external information, and external information with a high level of importance may be displayed with priority. The level of importance may be defined in advance in the game processing device 20, or may be set by the player P or another user.

The display mode of the first external information and the second external information in FIG. 5 through FIG. 12 may be set by the user on a settings screen. With the settings screen, settings can be set such as whether or not to display the first external information, whether or not to display the second external information, with what display mode to display if displaying the first external information, with what display mode to display if displaying the second external information, and the like. Such operations may be accomplished by operating the operating unit of the game processing device 20, and the settings screen at that time may be on the HMD or may be on a monitor connected to the game processing device 20.

In the above-described examples, the descriptions took as an example a game that progresses with the player character communicating with virtual characters, but the type of game is not limited to this.

For example, in the case of a shooting game or a competition game, it is possible to display strategy information for defeating an opponent character as the first external information. For example, strategy information might include the optimal weapon, the timing of an attack or weak points.

In the case of a fishing game, strategy information for catching a specific fish can be displayed as the first external information. For example, information related to the position, time, fishing pole, mechanism or feed for catching a specific fish can be displayed as the first external information on a screen where the player P makes selections.

When the game is a love simulation game, information such that the other character develops interest or favor can be displayed as the first external information. For example, as this type of information, information relating to personality, or presents the other character likes, can be displayed as the first external information on a screen where the player P makes selections.

In the case of a nurturing game, information for efficiently nurturing the character that is being nurtured can be displayed as the first external information. For example, information such as the feed the character being nurtured prefers, the timing and the amount of feeding, and the like can be displayed as the first external information on a screen where the player P makes selections.

In the case of a dress-up game, fashion information for the character that is being dressed up, such as accessories and clothing that are popular with others, can be displayed as the first external information. For example, fashion information on the character being dressed up as the first external information can be displayed on a screen where the player P makes selections, being the screen where the character is dressed up with clothes, accessories and the like.

As the HMD, there is, for example, a cap-style, opaque head mounted display. In addition, there is an eyeglasses type in which a projection device is mounted on the top or the front of eyeglasses and projects onto a projection device section. Furthermore, there is also a kind that mounts a smart device such as smartphone or the like on an eyeglasses-like adapter. The display may also be opaque so that the outside state cannot be seen, or the display device can be a half-silvered mirror and optically transmissive such that the outside state can be seen. Furthermore, the projection method may be a virtual image projection method that forms a virtual image by using a half-silvered mirror or the like, or may be a retinal projection method that causes image formation directly on the retina using the eye lens.

Three-dimensional images visualized with the HMD may use an anaglyph method in which images projected from differing angles left and right are reproduced superimposed with red and blue light, respectively, and viewed with eyeglasses having red and blue color filters on left and right. In addition, this may be a polarized eyeglasses method in which linearly polarized light intersecting at the left and right images is projected and superimposed, and this is separated by eyeglasses having polarization filters. Furthermore, this may be a liquid crystal shutter eyeglasses method wherein images projected from differing angles left and right are alternately reproduced, and are viewed with eyeglasses provided with liquid crystal shutters that alternately obstruct the left and right fields of vision.

The present embodiments can also be applied to systems other than game processing systems. For example, the embodiments can be applied to a surgical practice system. The patient undergoing surgery is displayed as a virtual-space image in the HMD, and the next action is displayed as the first external information. In addition, the doctor who is practicing often becomes immersed in the practice and can be notified of the surrounding environment with the second external information.

DESCRIPTION OF REFERENCE SYMBOLS

P Player
10 HMD
11 HMD controller
12 Sensor
13 Display
14 Speaker
20 Game processing device
21 Controller
21A Object specifying unit
21B Progress management unit
21C First display processor
21D Second display processor
21E Acquisition unit
21F Table
21G Determination unit
22 Memory unit
22A Image information
22B Object information
22C Game audio information
26 Mail server
27 Strategy site
28 Weather site
30 Operating device
31 Information processing unit
32 Tracking information detector
33 Operating unit
36 Tracking auxiliary device
40 Imaging device
41 Imaging unit
42 Detector
101C Character object
101E Email
101I Strategy information
101M Weather mark object
101S First specified object
101V Virtual-space image
101W Weather information
102R Real-space image
102S Second specified object
103S Third specified object
104A First region
104B Second region
104C Window

The invention claimed is:

1. A non-transitory computer readable medium storing a data processing program that causes a controller that displays a virtual-space image on a display device to function as:
a first display processor when first external information is input from outside, wherein
the first display processor is programmed to, when the virtual-space image is displayed on the display device, cause a display of the first external information on a first specified object when the first specified object is displayed in the virtual-space image,
the first display processor specifies the first specified object by accessing a memory storing object information on at least one virtual object included in the virtual-space image,
the first external information is displayed superimposed on a prescribed extent of the first specified object,
the first specified object is a virtual information processing device that is displayed as a distinct object in a first location within the virtual-space image,
a plurality of items of the first external information are input from the outside, and
the first display processor is programmed to display, on the first specified object, a highest priority item of the plurality of items of the first external information, priority of the plurality of items of the first external information being determined based on a type of each item of the first external information.

2. The non-transitory computer readable medium according to claim 1, wherein
the virtual information processing device is a virtual smartphone.

3. The non-transitory computer readable medium according to claim 2, wherein
a virtual character is displayed in the virtual-space image holding the virtual smartphone on which the first external information is displayed superimposed.

4. The non-transitory computer readable medium according to claim 1, wherein
the first external information is displayed on the virtual information processing device and includes at least one of email information, chat information, notification information of received data, and weather information.

5. The non-transitory computer readable medium according to claim 4, wherein
the email information and/or the chat information displayed on the virtual information processing device includes at least one of an indication that an email or a chat was received, a sender of the email or the chat, a title of the email or the chat, and a portion of a body of the email or the chat.

6. The non-transitory computer readable medium according to claim 1, wherein
a virtual character is displayed in the virtual-space image holding the virtual information processing device on which the first external information is displayed superimposed.

7. The non-transitory computer readable medium according to claim 1, wherein
the first display processor is programmed to acquire the first external information from one or more acquisition destinations, and
the acquisition destinations are recorded in advance by a user.

8. The non-transitory computer readable medium according to claim 1, wherein
the first display processor is programmed to
determine whether a prescribed time has elapsed, and when the prescribed time has elapsed, cancel the display of the first external information.

9. The non-transitory computer readable medium according to claim 1, wherein
the first display processor is programmed to continue displaying the first external information until subsequent external information is input from the outside.

10. The non-transitory computer readable medium according to claim 1, wherein
the first display processor is programmed to receive a selection by a user to select one of the plurality of items of the first external information for display on the first specified object.

11. The non-transitory computer readable medium according to claim 1, wherein
the first specified object is specified from among the at least one virtual object that is already displayed in the virtual-space image prior to the first external information being input from the outside.

12. The non-transitory computer readable medium according to claim 1, wherein
an item of the plurality of items of the first external information that has the priority lower than the highest priority item is not displayed on the first specified object.

13. The non-transitory computer readable medium according to claim 1, wherein
the types of the plurality of items of the first external information for which the priority differs include at least one of email information, chat information, notification information of received data, weather information, and game strategy information.

14. A data processing method that causes a virtual-space image to be displayed on a display device, the data processing method executing:
a first display processing step when first external information is input from outside, wherein
the first display processing step, when the virtual-space image is displayed on the display device, causes a display of the first external information on a first specified object when the first specified object is displayed in the virtual-space image,
the first display processing step specifies the first specified object by accessing a memory storing object information on at least one virtual object included in the virtual-space image,
the first external information is displayed superimposed on a prescribed extent of the first specified object,
the first specified object is a virtual information processing device that is displayed as a distinct object in a first location within the virtual-space image,
a plurality of items of the first external information are input from the outside, and
the first display processing step displays, on the first specified object, a highest priority item of the plurality of items of the first external information, priority of the plurality of items of the first external information being determined based on a type of each item of the first external information.

15. The data processing method according to claim 14, wherein
an item of the plurality of items of the first external information that has theft priority lower than the highest priority item is not displayed on the first specified object.

16. The data processing method according to claim 14, wherein
the types of the plurality of items of the first external information for which the priority differs include at least one of email information, chat information, notification information of received data, weather information, and game strategy information.

17. A data processing device that causes a virtual-space image to be displayed on a display device, the data processing device being provided with:
a first display processor when first external information is input from outside, wherein
the first display processor is programmed to, when the virtual-space image is displayed on the display device, cause a display of the first external information on a first specified object when the first specified object is displayed in the virtual-space image,
the first display processor specifies the first specified object by accessing a memory storing object information on at least one virtual object included in the virtual-space image,
the first external information is displayed superimposed on a prescribed extent of the first specified object,
the first specified object is a virtual information processing device that is displayed as a distinct object in a first location within the virtual-space image,
a plurality of items of the first external information are input from the outside, and
the first display processor is programmed to display, on the first specified object, a highest priority item of the plurality of items of the first external information, priority of the plurality of items of the first external information being determined based on a type of each item of the first external information.

18. The data processing device according to claim 17, wherein
an item of the plurality of items of the first external information that has theft priority lower than the highest priority item is not displayed on the first specified object.

19. The data processing device according to claim 17, wherein the types of the plurality of items of the first external information for which the priority differs include at least one of email information, chat information, notification information of received data, weather information, and game strategy information.

\* \* \* \* \*